3,364,255
2-ORGANOSULFINYL- AND 2-ORGANOSULFO-
NYL - DERIVATIVES OF (4 - ALKANOYLPHE-
NOXY) ALKANOIC ACIDS
Edward J. Cragoe, Jr., Lansdale, Pa., assignor to Merck
& Co., Inc., Rahway, N.J., a corporation of New Jersey
No Drawing. Filed Oct. 17, 1963, Ser. No. 317,086
21 Claims. (Cl. 260—519)

ABSTRACT OF THE DISCLOSURE (4-alkanoylphenoxy)alkanoic acids which are substituted in the 2-position of the alkanoyl chain by an organosulfinyl or organosulfonyl radical; and the salts, esters and amide derivatives of the said acids. The products are diuretic and saluretic agents which may be used in the treatment of conditions associated with edema.

The products are obtained by treating a [4-[2-(organothiomethyl)alkanoyl]phenoxy]alkanoic acid with an oxidizing agent capable of converting a sulfide to its sulfoxide and sulfone analog as, for example, by treatment with hydrogen peroxide.

---

This invention relates to a new class of (4-alkanoylphenoxy)alkanoic acid derivatives characterized by the presence of an organosulfinyl or organosulfonyl group at the 3-position of the alkanoyl moiety, to the non-toxic pharmacologically acceptable acid addition salts thereof, and to a process for their preparation. The said compounds exhibit marked pharmacological properties which make them useful as diuretics and, surprisingly, they combine good diuretic activity with little or no toxic side effects.

The novel phenoxyacetic acids are compounds having the following structural formula:

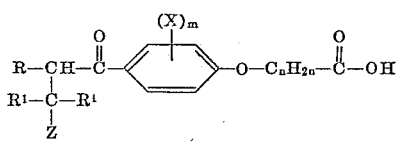

where R is a member selected from the group consisting of hydrogen, lower alkyl, e.g., methyl, ethyl, propyl, isopropyl, butyl, pentyl, hexyl, etc., halo-lower alkyl, e.g., trihalomethyl-lower alkyl, such as 2,2,2-trifluoroethyl, 2,2,2-trifluoroisopropyl, etc., cycloalkyl containing 3 to 6 nuclear carbon atoms, e.g., cyclopentyl, cyclohexyl, etc., cycloalkylalkyl containing 3 to 5 nuclear carbon atoms, e.g., cyclopropylmethyl, cyclobutylmethyl, cyclopentylethyl, etc.,

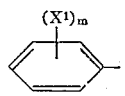

wherein $X^1$ represents a member selected from the group consisting of hydrogen, halogen, lower alkyl, trifluoromethyl, lower alkoxy, carboxy and lower alkylsulfonyl, e.g., mesyl and

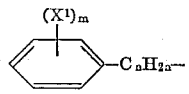

wherein $X^1$ is as defined above, $R^1$ is a member selected from the group consisting of hydrogen and lower alkyl, e.g., methyl, ethyl, isopropyl, butyl, etc., X is a member selected from the group consisting of hydrogen, halogen, trifluoromethyl, lower alkyl and lower alkoxy and, when substituted on adjacent carbon atoms of the benzene ring, two X radicals may be combined to form a 1,3-butadienylene linkage (i.e., —CH=CH—CH=CH—), Z is a member selected from the group consisting of —SO—$R^2$ and —SO$_2$—$R^2$, where $R^2$ is a member selected from the group consisting of lower alkyl, e.g., methyl, ethyl, propyl, isopropyl, butyl, hexyl, etc., substituted lower alkyl, e.g., lower alkoxyalkyl, e.g., 2-methoxyethyl, 2-amino-2-carboxyalkyl, e.g., 2-amino-2-carboxyethyl, halo-lower alkyl, e.g., 3- chloropropyl, 3,3,3-trifluoropropyl, etc., alkoxycarbonylalkyl, e.g., methoxycarbonylmethyl (i.e., CH$_3$OCOCH$_2$—), ethoxycarbonylalkyl, etc., carboxy-lower alkyl (e.g., —CH$_2$COOH), cycloalkyl, e.g., cyclopentyl, cyclohexyl, etc., cycloalkylalkyl, e.g., cyclopentylmethyl, cyclohexylmethyl. etc.. phenyl, substituted phenyl, e.g.,

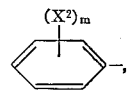

wherein $X^2$ is a member selected from the group consisting of halogen, lower alkyl, trifluoromethyl lower alkoxy, carboxy, lower alkylsulfonyl, e.g., mesyl, etc., phenyl-lower alkyl wherein lower alkyl represents a lower alkylene chain of 1–5 carbon atoms, e.g., benzyl, phenylethyl, etc., nuclear substituted phenyl-lower alkyl, e.g.,

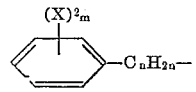

wherein $X^2$ is as defined above,

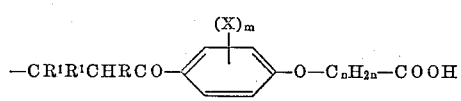

wherein R, $R^1$ and X are as defined above, and —C$_n$H$_{2n}$—Z wherein Z is as defined above, m, in each occurrence, is an integer having a value of 1–4 and n, in each occurrence, is an integer having a value of 1–5.

A preferred embodiment of the invention comprises a class of compounds of the formula:

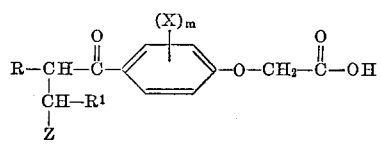

where R is a member selected from the group consisting of lower alkyl and halo-lower alkyl, $R^1$ is a member selected from the group consisting of hydrogen and lower alkyl, X is a member selected from the group consisting of hydrogen, halogen, and methyl and two X radicals on adjacent carbon atoms can be combined to form a 1,3-butadienylene linkage, i.e., —CH=CH—CH=CH—, Z is a member selected from the group consisting of —SO$_2$—$R^2$ and —SO$_2$—$R^2$ where $R^2$ represents lower alkyl, and m is an integer having a value of 1–4.

The method of preparing the products of the invention comprises reacting the corresponding sulfide precursors thereof with a suitable oxidizing agent. Essentially, the oxidation reaction proceeds in stages, the first of which produces the sulfoxide compound and the second of which yields the corresponding sulfone product. The following equation illustrates the process:

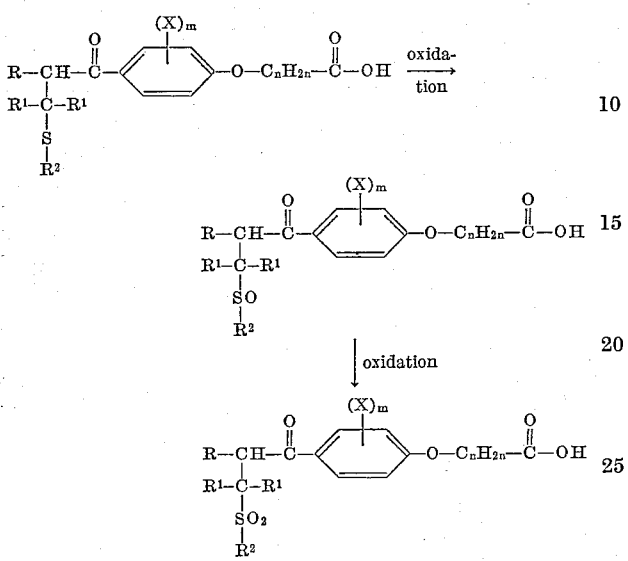

where R, $R^1$, $R^2$, X, m and n are as defined supra.

Any oxidizing agent capable of converting a sulfide to its sulfoxide and sulfone analogs is operable in the instant process and is to be considered as being within the scope of the invention. One such oxidizing agent which produces the sulfoxide and the sulfone derivatives in good yield and which we have found to be particularly suitable for the purposes of the instant process is hydrogen peroxide; we have also found, however, that the molar ratio of hydrogen peroxide to sulfide in solution must be carefully controlled. For example, by employing a substantially equal molar amount of hydrogen peroxide and sulfide reactant the product produced is predominantly the sulfoxide derivative. Conversely, by employing a molar ratio of at least two moles of hydrogen peroxide per mole of sulfide reactant, the compound produced is the corresponding sulfonyl derivative.

In general, the reaction temperature is not a critical factor in the process, but it can be appreciated that the temperature requirements will vary depending on the nature of the oxidizing agent employed. One skilled in the art will readily perceive, for example, that relatively strong oxidizing agents, such as hydrogen peroxide, normally react at a reasonable rate at moderate temperatures, whereas other and less strong oxidizing agents generally require the use of higher temperatures.

The choice of a suitable reaction solvent is within the purview of one skilled in the art and any one of a wide variety of solvents can be employed; thus, in general, any of a number of inert solvents in which the reactants are reasonably soluble can be employed to achieve the desired result. The sulfoxide and sulfone products of the process are generally obtained as white solids in good yield and, if desired, may be purified by recrystallization from a suitable solvent, e.g., isopropyl alcohol, acetonitrile or butyl chloride.

The [4 - [2 - (organomercaptomethyl)alkanoyl] - phenoxy]acetic acids, employed as reactants in the process, may be prepared by a variety of methods. One method comprises reacting a [4-[2-(disubstituted-aminomethyl)-alkanoyl]phenoxy]acetic acid with either a mercaptan, or hydrogen sulfide, or the salts of a mercaptan or hydrogen sulfide, in the presence of sodium bicarbonate as illustrated by the following equation:

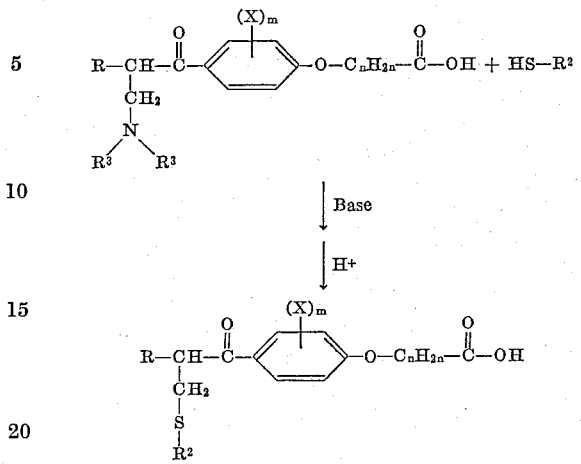

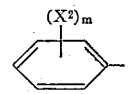

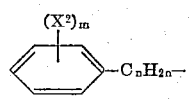

where R, X, m and n are as defined above, $R^2$ is a member selected from the group consisting of lower alkyl, e.g., methyl, ethyl, propyl, isopropyl, butyl, hexyl, etc., substituted lower alkyl, e.g., lower alkoxyalkyl, e.g., 2-methoxyethyl, 2-amino-2-carboxyalkyl, e.g., 2-amino-2-carboxyethyl, halo-lower alkyl, e.g., 3-chloropropyl, 3,3,3-trifluoropropyl, etc., alkoxycarbonylalkyl, e.g., methoxycarbonylmethyl (i.e., $CH_3OCOCH_2-$), ethoxycarbonylalkyl, etc., carboxy lower alkyl (e.g., $-CH_2COOH$), cycloalkyl, e.g., cyclopentyl, cyclohexyl, etc., cycloalkylalkyl, e.g., cyclopentylmethyl, cyclohexylmethyl, etc., phenyl, substituted phenyl, e.g., $(X^2)_m$ wherein $X^2$ is a member selected from the group consisting of hydrogen, halogen, lower alkyl, trifluoromethyl lower alkoxy, carboxy, lower alkylsulfonyl, e.g., mesyl, etc., phenyl-lower alkyl wherein lower alkyl represents a lower alkylene chain of 1–5 carbon atoms, e.g., benzyl, phenylethyl, etc., nuclear substituted phenyl-lower alkyl, e.g., $(X^2)_m$ $(X^2)_m$—$C_nH_{2n}-$ wherein $X^2$ is as defined above, $R_3$ represents lower alkyl, e.g., methyl, ethyl, etc., or together the two $R^3$ radicals may be joined with the nitrogen atom to which they are attached to form an heterocyclic radical, e.g., piperidino, m, in each occurrence, is an integer having a value of 1–4 and n, in each occurrence, is an integer having a value of 1–5. Another method comprises the reaction of a [4-(2-methylenealkanoyl)-phenoxy]acetic acid with a mercaptan. The following equation illustrates this method of synthesis:

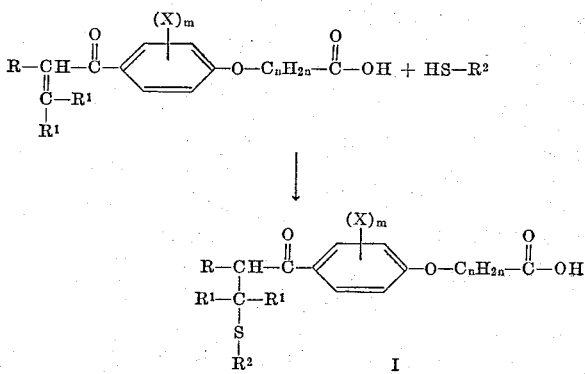

I where R, $R^1$, $R^2$, X, m and n are as defined immediately above. In general, temperature and the nature of the solvent employed are not critical to the success of these reactions and the syntheses can be carried out using any one of a variety of solvents and either at ambient or elevated temperatures. Generally, it is most advantageous to conduct the reaction in an aqueous medium in the presence of a weak base, e.g., sodium bicarbonate, and then acidify the mixture in order to cause the sulfide product to separate. The mixture then is cooled and the product isolated, usually in the form of a solid.

If dithiols of the type HS—Y—SH are employed in either of the processes described in the preceding paragraph, sulfides of the type depicted below are obtained:

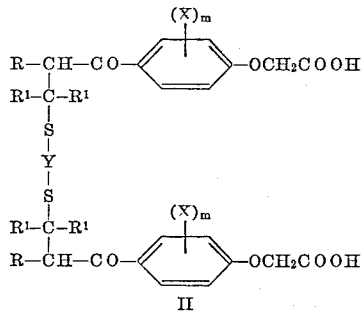

II where Y represents an alkylene moiety of the formula $—C_nH_{2n}—$ and the radicals R, $R^1$, X, m and n are as defined above.

When hydrogen sulfide or sodium hydrosulfide, i.e., NaHS, is substituted for the mercaptan, $R^2SH$, in either of the processes described above for preparing the sulfide reactants a sulfide of the following type is obtained:

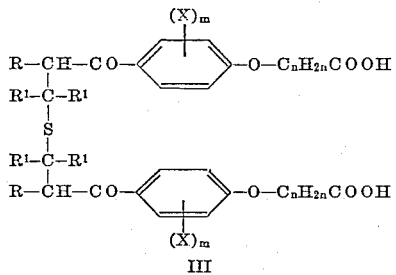

III wherein the radicals R, $R^1$, X, m and n are as defined above.

The synthesis of the sulfides of type I by the methods described above produces a racemic mixture whereas sulfides of types II and III may be produced as mixtures of racemic and meso-isomers. These isomeric sulfide mixtures can be oxidized to their corresponding sulfoxides and sulfones and then be separated or resolved by standard methods to obtain the pure isomers or they first may be separated into their pure isomers and then oxidized to the corresponding sulfoxide or sulfone.

The isomer problem is greatly complicated with the formation of the sulfoxides inasmuch as a new asymmetric center is created and the number of possible isomers that may form is increased. However, separation of these isomers can be effected by standard methods.

The foregoing discussion regarding the isomer problem has been restricted to the more usual situation, i.e., wherein the $R^1$ substituents are identical. With compounds wherein the $R^1$ substituents are dissimilar the number of possible isomers is again increased.

This invention also relates to the acid addition salts of the instant phenoxyacetic acids which are prepared by the reaction of the said acids with a base having a non-toxic pharmacologically acceptable cation. In general, any base which will form an acid addition salt with a carboxylic acid and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines, such as monoalkylamines, dialkylamines, trialkylamines, nitrogen containing heterocylic amines, e.g., piperidine, etc. The acid addition salts thus produced are the functional equivalent of the corresponding phenoxyacetic acids and one skilled in the art will appreciate that to the extent that the phenoxyacetic acids of the invention are useful in therapy, the variety of acid addition salts embraced by this invention are limited only by the criterion that the bases employed in forming the salts be both non-toxic and physiologically acceptable.

The following examples are illustrative of the [4-[2-(organosulfonylmethyl)alkanoyl]phenoxy]acetic acids and the [4-[2-(organosulfinylmethyl)alkanoyl]-phenoxy] acetic acids of the invention and the method by which they may be prepared. The examples are illustrative only and the invention should not be construed as being limited thereto.

EXAMPLE 1

[2,3-dichloro-4-[2-(methylsulfinylmethyl)butyryl]-phenoxy]acetic acid

STEP A.—2,3-DICHLOROANISOLE

A five-liter, 4-necked round-bottomed flask is equipped with a stirrer, reflux condenser and two dropping funnels. 2,3-dichlorophenyl (400 g., 2.45 moles) is placed in the flask and methanol (400 ml.) and 10 N sodium hydroxide (245 ml., 2.45 moles) are added. The temperature rises to 55° C. The mixture is heated to 80–85° C. on a steam bath and 10 N sodium hydroxide (615 ml. 6.15 mole) is placed in one dropping funnel and dimethyl sulfate (816 ml., 1090 g., 8.6 moles) in the other. The base and dimethyl sulfate are then added simultaneously in a dropwise manner over 3½ hours with stirring. Heating and stirring then is continued for 1 hour. The mixture then is cooled and water (600 ml.) is added. The oil that separates soon solidifies. The solid is collected by filtration and dissolved in ether (500 ml.). The filtrate is extracted with ether (400 ml.) and the two ether solutions are combined and dried over anhydrous sodium sufate. The ether is evaporated and the residue is dried in a vacuum desiccator over phosphorus pentoxide. The yield is 428 g. (98%) of 2,3-dichloroanisole, M.P. 32–33° C.

STEP B.—2,3-DICHLORO-4-BUTYRYLPHENOL

Butyryl chloride (128.0 g., 1.2 moles), 2,3-dichloroanisole (197.7 g., 1.11 moles), prepared as described in Step A. and carbon disulfide (400 ml.) are placed in a four-necked flask fitted with a mechanical stirrer, thermometer, reflux condenser (protected by a calcium chloride tube) and a Gooch sleeve bearing a 250 ml. Erlenmeyer flask containing anhydrous aluminum chloride (160 g., 1.2 moles). While the reaction mixture is cooled in an ice bath, the aluminum chloride is added in small portions with stirring at such a rate that the temperature of the reaction mixture does not exceed 20–25° C. The ice bath is removed and the mixture is stirred at room temperature for 1 hour, then in a water bath at 55° C. for 45 minutes and then kept at room temperature overnight.

n-Heptane (400 ml.) and aluminum chloride (160 g., 1.2 moles) then are added. The condenser is set for distillation, the mixture is stirred and heated in a water bath heated by means of a steam bath and the carbon disulfide is distilled off. A second portion of heptane (400 ml.) is added, the condenser is set for reflux, the reaction mixture is stirred and heated in a bath at 80° C. for 3 hours and then allowed to cool. The hexane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted twice with a total of two liters of 5% sodium hydroxide. The sodium hydroxide extract is stirred with decolorizing carbon ("Norite") (2–3 teaspoons) and filtered by suction through a pad of diatomaceous earth ("Super-cel"). Upon acidification, a light brown solid separates. This is collected by filtration, washed with water and dried at 100° C. for 3 hours.

The dried solid is dissolved in hot benzene (1 liter) and the insoluble matter is removed by filtration. Upon cooling, a slightly colored solid separates. This is dissolved in hot benzene (750 ml.), the solution is allowed to cool to room temperature and then chilled to 10° C. in a refrigerator. The product (203 g., 85%); M.P. 109–110.5° C., is collected by filtration. The product is taken up in 1500 ml. of hot benzene, treated with decolorizing carbon ("Norite") and filtered. Upon cooling, a white solid identified as 2,3-dichloro-4-butyrylphenol (180 g., 75%); M.P. 109–110° C., separates.

Analysis for $C_{10}H_{10}Cl_2O_2$: Calculated: C, 51.52; H, 4.32; Cl, 30.42. Found: C, 51.70; H, 4.24; Cl, 30.32.

STEP C.—ETHYL (2,3-DICHLORO-4-BUTYRYLPHENOXY) ACETATE

Dry 1,2-dimethoxyethane (100 ml.) is placed in a 1-liter, 4-necked, round-bottomed flask equipped with a stirrer, reflux condensed (protected by a calcium chloride tube) and a dropping funnel. Sodium hydride (10.3 g. of a 53% solution in mineral oil, 0.215 mole) is added, the stirrer started and a solution of 4-butyryl-2,3-dichlorophenol (50 g., 0.215 mole) in dry 1,2-dimethoxyethane (150 ml.) is added, dropwise, over a period of 30 minutes. After the evolution of gas has ceased, ethyl bromoacetate (35.9 g., 0.215 mole) is introduced, dropwise, over 30 minutes.

The mixture is stirred and heated on a steam bath for 3.5 hours. The major portion of the 1,2-dimethoxyethane is removed by distillation, then ether (400 ml.) and sufficient water to dissolve the precipitated sodium bromide are added. The ether layer is separated, washed with water and dried over anhydrous sodium sulfate. The ether is removed by distillation and the residue is distilled in vacuo. The portion boiling at 180–195° C. at 0.5 mm. mercury pressure is collected. Upon standing, the distillate crystallizes to a white solid, M.P. 53–54° C. The yield is 64 g. (95%). Recrystallization from a 1:5 mixture of benzene and cyclohexane gives material melting at 55–56° C.

Analysis for $C_{14}H_{16}Cl_2O_4$: Calculated: C. 52.68; H, 5.05; Cl, 22.22. Found: C, 52.79; H, 5.03; Cl, 22.07.

STEP D.—(2,3-DICHLORO-4-BUTYRYLPHENOXY) ACETIC ACID

Ethyl (2,3-dichloro-4-butyrylphenoxy)acetate (30 g., 0.095 mole) is dissolved in methanol (100 ml.) and is treated with a solution of 85% potassium hydroxide (13.2 g., 0.2 mole) in methanol (100 ml.). The mixture is stirred for an hour and then the methanol is removed by distillation at reduced pressure. The residue is dissolved in hot water and the solution cooled and acidified with hydrochloric acid. The solid that separates is (2,3-dichloro-4-butyrylphenoxy)acetic acid. The yield is 26 g. (95%) of material which, after recrystallization from a 1:3.6 mixture of benzene and cyclohexane, melts at 110.5–111.5° C. (A dimorphic form melting at 100–101° C. is sometimes isolated.)

Analysis for $C_{12}H_{12}Cl_2O_4$: Calculated: C, 49.51; H, 4.15; Cl, 24.36. Found: C, 49.81; H, 4.22; Cl, 24.40.

STEP E.—[2,3-DICHLORO - 4 - [2 - (DIMETHYLAMINOMETHYL) - BUTYRYL]PHENOXY]ACETIC ACID HYDROCHLORIDE

In a 100 ml. round flask equipped with an outlet tube suitable for connecting to a water aspirator is placed an intimate mixture of (2,3-dichloro-4-butyrylphenoxy)acetic acid (5.20 g., 0.0179 mole), paraformaldehyde (0.63 g., 0.072 mole), dry dimethylamine hydrochloride (1.59 g., 0.0195 mole) and 4 drops acetic acid. The mixture is heated on the steam bath for about 1.5 hours and during this period the internal pressure of the vessel is reduced to about 15 mm. mercury for a period of 1 minute at 15 minute intervals. Upon cooling, a solid is obtained which is triturated with ether to give 5.8 g. (85%) of [2,3 - dichloro-4 - [2-(dimethylaminomethyl)butyryl]phenoxy]acetic acid hydrochloride in the form of a white solid. After two recrystallizations carried out by dissolving the solid in hot methanol and gradually adding ether, the product melts at 165–167° C.

Analysis for $C_{15}H_{20}Cl_3NO_4$: Calculated: C, 46.83; H, 5.24; Cl, 27.65; N, 3.64. Found: C, 46.69; H, 5.31; Cl, 27.59; N, 3.53.

STEP F.—[2,3-DICHLORO - 4 - [2 - (METHYLMERCAPTOMETHYL)-BUTYRYL]PHENOXY]ACETIC ACID

[2,3 - dichloro-4 - [2-(dimethylaminomethyl)butyryl]phenoxy]acetic acid hydrochloride (3.76 g., 0.015 mole) was dissolved in a solution containing sodium bicarbonate (2.52 g., 0.03 mole) and water (150 ml.). The solution was stirred and a stream of gaseous methyl mercaptan was admitted below the surface of the solution for 15 minutes. The addition of methyl mercaptan was continued while the stirred solution was heated on a steam bath for 1½ hours.

After cooling the reaction mixture to room temperature it is made acid to Congo-red test paper by the addition of 6 N hydrochloric acid. The resulting gum is extracted with ether and the combined extracts are dried over anhydrous magnesium sulfate. The ether is evaporated under reduced pressure to give a white solid, M.P. 82–86° C. Recrystallization from a mixture of benzene and cyclohexane gives 15.0 g. (86%) of [2,3-dichloro-4-[2-methylmercaptomethyl)butyryl]phenoxy]acetic acid in the form of white prisms, M.P. 86–89° C.

Analysis for $C_{14}H_{16}Cl_2O_4S$: Calculated: C, 47.87; H, 4.59; S, 9.13. Found: C, 48.13; H, 4.56; S, 9.07.

STEP G.—[2,3-DICHLORO-4-[2-(METHYLSULFINYLMETHYL)-BUTYRYL]PHENOXY]ACETIC ACID

[2,3 - dichloro-4 - [2-(methylmercaptomethyl)butyryl]phenoxy]acetic acid (6.22 g., 0.01772 mole) is dissolved in 25 ml. of acetic acid and treated, dropwise, with a solution of 33.2% hydrogen peroxide (1.91 g.; 0.01861 mole) in acetic acid (5 ml.). The colorless solution is allowed to stand at room temperature.

After 17 hours, the reaction solution is concentrated to dryness under reduced pressure. The viscous residue is dissolved in ethyl acetate (10 ml.) and treated with butyl chloride (10 ml.) to give 4.90 g. of a white solid identified as [2,3-dichloro-4 - [2-(methylsulfinylmethyl) butyryl]phenoxy]acetic acid (75%). The product is purified by three recrystallizations from a mixture of acetonitrile and butyl chloride and has a melting point of 123.5–124.5° C.

Analysis for $C_{14}H_{16}Cl_2O_5S$: Calculated: C, 45.79; H, 4.39; S, 8.73; Cl, 19.31. Found: C, 45.93; H, 4.46; S, 8.52; Cl, 19.38.

EXAMPLE 2

*[2,3-dichloro-4-[2-(mesylmethyl)butyryl]-phenoxy]acetic acid*

To a solution of [2,3-dichloro-4-[2-(methylmercaptomethyl)butyryl]phenoxy]acetic acid (5.97 g., 0.017 mole), prepared by the process described in Steps A through F of Example 1, in acetic acid (30 ml.) is added a 33.2% aqueous solution of hydrogen peroxide (5.23 g., 0.051 mole), dropwise, with cooling. The resulting colorless solution is allowed to stand at room temperature.

After 66 hours, the reaction solution is slowly treated with water (250 ml.) until precipitation is complete. The resulting while solid is collected, washed with water and dried to give 5.46 g. (84%) of [2,3-dichloro-4-[2-mesylmethyl)butyryl]phenoxy]acetic acid, M.P. 137–140° C. Recrystallization from isopropyl alcohol gives 5.34 g. of product in the form of white prisms, M.P. 139.5–140.5° C.

Analysis for $C_{14}H_{16}Cl_2O_6S$: Calculated: C, 43.87; H, 4.21; S, 8.37. Found: C, 43.68; H, 4.21; S, 8.49.

EXAMPLE 3

{2,3 - dichloro - 4 - [2 - [(2 - carboxy - 2 - aminoethyl) sulfinylmethyl]butyryl]phenoxy}acetic acid and {2,3-dichloro - 4 - [2 - [(2 - carboxy - 2 - aminoethyl) sulfonylmethyl]butyryl]phenoxy}acetic acid STEP A.—{2,3-DICHLORO-4-[2-[(2-CARBOXY - 2 - AMINOETHYL)MERCAPTOMETHYL]BUTYRYL]PHENOXY} ACETIC ACID

[2,3 - dichloro - 4 - [2 - dimethylaminomethyl)butyryl]phenoxy]acetic acid hydrochloride (1.92 g., 0.005 mole), sodium bicarbonate and water (40 ml.) are heated 5 minutes at 60° C., treated with L-cysteine·HCl·H₂O (8.75 mg., 0.005 mole) in 10 ml. of water and stirred one hour at room temperature. The clear solution is slowly treated with 6 N hydrochloric acid. A light gum forms at first which then dissolves. The solution is treated with concentrated hydrochloric acid (20 ml.) and cooled. A light solid forms which is filtered, dried and identified as {2,3 - dichloro - 4 - [2 - [(2 - carboxy - 2 - aminoethyl) mercaptomethyl]butyryl]phenoxy}acetic acid. The yield is 1.70 g. (75%), M.P. 188–189° C.

Analysis for $C_{16}H_{20}Cl_3NO_6S$: Calculated: C, 41.74; H, 4.38; Cl, 23.08. Found: C, 41.85; H, 4.50; Cl, 22.88.

STEP B.—{2,3-DICHLORO - 4 - [2 - [(2-CARBOXY-2-AMINO-ETHYL)SULFINYLMETHYL]BUTYRYL]PHENOXY} ACETIC ACID

This compound is prepared in a manner similar to that described in Example 1G except that [2,3-dichloro-4-[2-(methylmercaptomethyl)butyryl]phenoxy]acetic acid is replaced by {2,3 - dichloro - 4 -[ 2 - [(2 - carboxy - 2-aminoethyl)mercaptomethyl]butyryl]phenoxy}acetic acid.

STEP C.—{2,3-DICHLORO - 4 - [2-[(2-CARBOXY - 2 - AMINO-ETHYL)SULFONYLMETHYL]BUTYRYL]PHENOXY} ACETIC ACID

This compound is prepared in a manner similar to that described in Example 2 except that [2,3-dichloro-4-[2-(methylmercaptomethyl)butyryl]phenoxy]acetic acid is replaced by {2.3 - dichloro - 4 - [2 - [(2 - carboxy - 2-aminoethyl)sulfinylmethyl]butyryl]phenoxy}acetic acid.

EXAMPLE 4

[2,3 - dichloro - 4 - [3 - (2 - carboxy - 2 - aminoethyl) sulfinylpropionyl]phenoxy]acetic acid and [2,3 - dichloro - 4 - [3 - (2 - carboxy - 2 - aminoethyl)sulfonylpropionyl]phenoxy]acetic acid

STEP A.—2,3-DICHLORO-4-ACETYLPHENOL

A 2-liter, 4-necked, resin flask fitted with a mechanical stirrer, water-cooled condenser and calcium chloride drying tube and Gooch tubing is dried in a stream of nitrogen and charged with 2,3-dichloroanisole (71 g., 0.4 mole), carbon disulfide (440 ml.) and acetyl chloride (63 g., 0.8 mole).

Aluminum chloride (powdered; 106 g., 0.8 mole) is added via the Gooch tubing over a ten minute period. The reaction is stirred at room temperature for 5 hours and allowed to stand overnight.

The reaction is then heated one hour at 55° C. in a water bath, cooled to 25° C., treated with 53 g. of aluminum chloride, and heated one hour at 55° C. The condenser is set for downward distillation; 350 ml. of heptane (dried over aluminum chloride) is added to the reaction and heated on a steam bath. The carbon disulfide is collected and heating is continued for 3 hours at reflux. After cooling, the heptane is decanted, and the solid product is scraped onto 500 g. of ice containing 45 ml. of concentrated hydrochloric acid. The product is extracted with 600 ml. of ether in several portions, evaporated to dryness, treated with 1.2 liters of 5% aqueous sodium hydroxide and heated one hour at reflux. When cool the solution is extracted with ether, then acidified with concentrated hydrochloric acid to Congo-red. The product is extracted into 600 ml. of ether, dried over sodium sulfate and evaporated in vacuo. The residue is recrystallized from benzene to give 60 g. (73%) of 2′,3′-dichloro-4′-hydroxyacetophenone which melts at 153–155° C.

Analysis for $C_8H_6Cl_2O_2$: Calculated: C, 46.86; H, 2.95. Found: C, 47.69; H, 3.01.

STEP B.—(2,3-DICHLORO-4-ACETYLPHENOXY) ACETIC ACID

A one-liter, round-bottomed, three-necked flask fitted with a condenser and drying tube, nitrogen inlet tube and dropping funnel is charged with ethanol (450 ml.) and sodium metal (3.79 g., 0.165 mole). When the reaction is complete, the solution is treated with 2,3-dichloro-4-acetylphenol (30.75 g., 0.15 mole) and ethyl bromacetate (30.06 g., 0.18 mole) and then refluxed for two hours. A solution of potassium hydroxide (16.83 g., 0.3 mole) in water is added and the solution refluxed for one hour. The ethanol is distilled from the reaction mixture at atmospheric pressure. The residual aqueous solution is acidified (to Congo-red paper) with concentrated hydrochloric acid, cooled and extracted four times with ether (300 ml. portions). The combined ether extracts are dried over sodium sulfate and evaporated in vacuo. The residue is recrystallized from xylene (500 ml.) to give 32.2 g. (85%) of (2,3 - dichloro - 4 - acetylphenoxy)acetic acid which melts at 154–156° C.

Analysis for $C_{10}H_8Cl_2O_4$: Calculated: C, 45.67; H, 3.07; Cl, 26.96. Found: C, 45.60; H, 2.92; Cl, 26.78.

STEP C.—[2,3-DICHLORO - 4 - (3-DIMETHYLAMINOPROPIONYL)PHENOXY]ACETIC ACID HYDROCHLORIDE (2,3-dichloro-4-acetylphenoxy)acetic acid (15.8 g., 0.06 mole), dimethylamine hydrochloride (4.94 g., 0.06 mole), paraformaldehyde (1.98 g., 0.066 mole) and glacial acetic acid (2 ml.) are combined and heated under anhydrous conditions on a steam bath for two hours with occasional application of a partial vacuum to remove the water formed in the reaction. The solid product is dissolved in 500 ml. of 90% aqueous ethanol, filtered and treated with 400 ml. of ether to give 9.9 g. (46%) of the title compound which melts at 194–196° C.

Analysis for $C_{13}H_{15}Cl_2NO_4 \cdot HCl$: Calculated: C, 43.78; H, 4.52; N, 3.93. Found: C, 43.91; H, 4.57; N, 3.71.

STEP D.—{2,3-DICHLORO-4-[3-[(2-CARBOXY - 2 - AMINO-ETHYL)MERCAPTO]PROPIONYL]PHENOXY}ACETIC ACID HYDROCHLORIDE

[2,3 - dichloro - 4 - (3 - dimethylaminopropionyl)phenoxy]acetic acid hydrochloride (835 mg., 0.00234 mole) is suspended in water (25 ml.) and, with vigorous stirring, treated with a solution of sodium bicarbonate (394 mg.) and water (10 ml.). Then a solution containing cysteine hydrochloride (410 mg., 0.00234 mole) and sodium bicarbonate (394 mg.) in water (10 ml.) is added. The reactants are rapidly heated to 60° C. on a steam bath, then removed and allowed to cool to 25° C. The solution is treated with 4 N hydrochloric acid to obtain a pH of 1.5. The {2,3 - dichloro-4-[-3-[(2-carboxy-2-aminoethyl)mercapto]propionyl]phenoxy}acetic acid hydrochloride which separates (900 mg., 89%) is dissolved in 16 ml. of ethanol containing 0.5 ml. of 6 N hydrochloric acid, filtered and slowly treated with 200 ml. of ether. The product is filtered and dried, M.P. 176–177° C.

Analysis for $C_{14}H_{15}Cl_2NO_6S \cdot HCl$: Calculated: C, 38.86; H, 3.73; N, 3.24; Cl, 24.58. Found: C, 38.70; H, 3.93; N, 3.18; Cl, 24.74.

STEP E.—[2,3-DICHLORO-4-[3-(2-CARBOXY - 2 - AMINO-ETHYL)SULFINYLPROPIONYL]PHENOXY]ACETIC ACID

This compound is prepared in a manner similar to that described in Example 1, Step G, except that [2,3-dichloro-4-[2 - methylmercaptomethyl)butyryl]phenoxy]acetic acid is replaced by {2,3 - dichloro-4-[3-[(2-carboxy-2-amino-ethyl)mercapto]propionyl]phenoxy}acetic acid.

STEP F.—[2,3-DICHLORO-4-[3-(2-CARBOXY - 2 - AMINO-ETHYL)SULFONYLPROPIONYL]PHENOXY]ACETIC ACID

This compound is prepared in a manner similar to that described in Example 2 except that [2,3-dichloro-4-[2-(methylmercaptomethyl)butyryl]phenoxy]acetic acid is replaced by {2,3 - dichloro - 4 - [3 - [(2-carboxy-2-amino-ethyl)mercapto]propionyl]phenoxy}acetic acid.

The following example illustrates the method of preparing the sulfoxide and sulfone derivatives of the invention by the alternative route of condensing a [4-(2-alkylidene)alkanoylphenoxy]acetic acid with a mercaptan.

EXAMPLE 5

[2,3-dichloro - 4 - [2 - ethyl - 3 - (methylsulfinyl)butyryl]-phenoxy]acetic acid and [2,3-dichloro - 4 - (2 - ethyl-3-mesylbutyryl)phenoxy]acetic acid

STEP A.—2,3-DICHLORO-4-(2-ETHYLBUTYRYL)PHENOL

A mixture of 2,3-dichloroanisole (53.11 g., 0.3 mole), carbon disulfide (350 ml.) and 2-ethylbutyryl chloride (80.77 g., 0.6 mole) is treated under anhydrous conditions with aluminum chloride powder (40.00 g., 0.3 mole), over a period of 5 minutes with stirring. The mixture is stirred for 6 hours at room temperature and then allowed to stand at room temperature overnight. The reaction mixture is heated with stirring in a 55° C. water bath until the evolution of hydrogen chloride ceases (1½ hour), cooled to room temperature and treated, under anhydrous conditions, with aluminum chloride powder (40.00 g., 0.3 mole), over a period of 5 minutes with stirring. The mixture is then heated in a 55° C. water bath with stirring for 1½ hours and the carbon disulfide is removed under reduced pressure by distillation. An equal volume of dry heptane is added and the mixture is heated on a steam bath with stirring for 3 hours. After cooling to room temperature, the heptane is decanted and the gummy residue is added to a mixture of ice (450 g.) and concentrated hydrochloric acid (45 ml.). The resulting oil is extracted with ether, dried over anhydrous sodium sulfate and the ether then removed under reduced pressure to give a semi-solid residue. This material is treated with excess 5% aqueous sodium hydroxide solution and heated under reflux for one hour, then cooled and extracted with ether to remove insoluble oil. The clear aqueous solution is acidified with concentrated hydrochloric acid and the resulting oil is extracted with ether, the ethereal solution dried over anhydrous sodium sulfate and the ether removed under reduced pressure to give a solid. Distillation of the residual oil gives 34.45 g. (44%) of the product in the form of a liquid, B.P. 140–142° C. at 0.5 mm. pressure. After three recrystallizations from hexane, 2,3-dichloro-4-(2-ethylbutyryl)phenol is obtained in the form of white needles, M.P. 85–86° C.

Analysis for $C_{12}H_{14}Cl_2O_2$: Calculated: C, 55.19; H, 5.40; Cl, 27.15. Found: C, 55.21; H, 5.64; Cl, 26.98.

STEP B.—[2,3-DICHLORO-4-(2-ETHYLBUTYRYL)PHENOXY]ACETIC ACID

A solution of sodium (2.53 g., 0.11 mole) in absolute ethanol (300 ml.) is treated first with 2,3-dichloro-4-(2-ethylbutyryl)phenol (26.12 g., 0.1 mole) and then with ethyl bromacetate (20.04 g., 0.12 mole) and the resulting clear solution is heated under reflux, with stirring, for 2 hours. Then aqueous 5% potassium hydroxide (11.22 g., 0.2 mole) is added and refluxing with stirring is continued for 1 hour longer. The alcohol is removed by distillation at atmospheric pressure and the boiling aqueous residue is made acid to Congo-red test paper by the addition of concentrated hydrochloric acid. An oil separates which solidifies after cooling to room temperature. It is extracted with ether, the ethereal extract dried over anhydrous sodium sulfate, and the ether then is removed under reduced pressure to give 31.9 g. (100%) of [2,3-dichloro-4-(2-ethylbutyryl)phenoxy]acetic acid in the form of a white solid, M.P. 128–139° C. One recrystallization from a mixture of benzene and cyclohexane gives 28.7 g. (90%) of the product in the form of needles, melting at 144.5–145.5° C.

Analysis for $C_{14}H_{16}Cl_2O_4$: Calculated: C, 52.58; H, 5.05; Cl, 22.22. Found: C, 52.75; H, 5.00; Cl, 22.08.

STEP C.—[2,3-DICHLORO-4-(2-BROMO-2-ETHYL-BUTYRYL)PHENOXY]ACETIC ACID

To a solution of [2,3-dichloro-4-(2-ethylbutyryl)phenoxy]acetic acid (19.26 g., 0.0603 mole) in 530 ml. of acetic acid is added with stirring 48% hydrobromic acid (2 drops) followed by the dropwise addition of bromine (9.64 g., 0.0603 mole) in 50 ml. of acetic acid. After the addition is completed, the mixture is stirred for 15 minutes and then poured into 1 liter of water containing 2 g. of sodium bisulfite.

The solid that separates is collected on a filter, washed with water, dried in air, crystallized from 55 ml. of benzene to give 23.71 g. (99%) of [2,3-dichloro-4-(2-bromo-2-ethylbutyryl)phenoxy]acetic acid in the form of a white solid, M.P. 151.5–152.5° C. One recrystallization from benzene gives the product in the form of white needles, M.P. 151.5–152.5° C.

Analysis for $C_{14}H_{15}BrCl_2O_4$: Calculated: C, 42.24; H, 3.80; Cl, 17.81. Found: C, 42.53; H, 4.00; Cl, 17.73.

STEP D.—[2,3-DICHLORO-4-(2-ETHYLIDENEBUTYRYL)PHENOXY]ACETIC ACID

[2,3 - dichloro - 4-(2-bromo-2-ethylbutyryl)phenoxy] acetic acid (19.91 g., 0.05 mole) is dissolved in dimethyl formamide (140 ml.) and anhydrous lithium chloride (6.36 g., 0.15 mole) is added. The mixture is heated on a steam bath with occasional shaking for 2 hours, cooled and poured into 1 liter of cold water. The solid that separates is collected by filtration, washed with 500 ml. of water and then dissolved in dilute sodium bicarbonate solution. The solution is shaken with Norite, filtered free of solid and acidified. The solid that separates is dried in air and recrystallized from a mixture of benzene and cyclohexane to give 14.52 g. (92%) of [2,3-dichloro-4-(2-ethylidenebutyryl)phenoxy]acetic acid in the form of white needles, M.P. 124–125.5° C. A second recrystallization from the same solvent mixture does not change the melting point.

Analysis for $C_{14}H_{14}Cl_2O_4$: Calculated: C, 53.02; H, 4.45; Cl, 22.36. Found: C, 53.28; H, 4.43; Cl, 22.34.

STEP E.—[2,3-DICHLORO-4-[2-ETHYL-3-(METHYLMERCAPTO)BUTYRYL]PHENOXY]ACETIC ACID

[2,3 - dichloro - 4-(2-ethylidenebutyryl)phenoxy]acetic acid (15.9 g., 0.05 mole) is placed in a 500 ml. 3-necked flask fitted with a mechanical stirrer, and gas-inlet tube. Water (300 ml.) is added and the solid dissolved by adding sodium bicarbonate (4.20 g., 0.05 mole). The solution is stirred and gaseous methyl mercaptan is slowly admitted below the surface of the solution for 12 hours. The solution is acidified with dilute hydrochloric acid whereby [2,3 - dichloro-4-[2-ethyl-3-(methylmercapto)butyryl]phenoxy]acetic acid separates.

STEP F.—[2,3-DICHLORO-4-[2-ETHYL-3-(METHYLSULFINYL)BUTYRYL]PHENOXY]ACETIC ACID

This compound is prepared in a manner similar to that described in Example 1, Step G, except that [2,3-dichloro - 4 - [2 - (methylmercaptomethyl)butyryl]phenoxy]acetic acid is replaced by [2,3-dichloro-4-[2-ethyl-3-(methylmercapto)butyryl]phenoxy]acetic acid.

STEP G.—[2,3-DICHLORO-4-(2-ETHYL-3-MESYL-BUTYRYL)PHENOXY]ACETIC ACID

This compound is prepared as described in Example 2 except that [2,3 - dichloro-4-[2-(methylmercaptoethyl)butyryl]phenoxy]acetic acid is replaced by [2,3-dichloro-4 - [2 - ethyl - 3-(methylmercapto)butyryl]phenoxy]acetic acid.

Following substantially the same procedure described in Steps A through F of Example 1, or in Steps A through E of Example 5, the sulfides listed in Table I infra were prepared. Oxidation of the said sulfides with an approximately equimolar amount of oxidizing agent, according to the method described in Step G of Example 1, produces their corresponding sulfoxide derivatives, whereas oxidation of the said sulfides with two mole equivalents of oxidizing agent, according to the process described in Example 2, produces their corresponding sulfone counterparts.

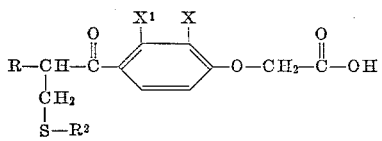

TABLE I

| Ex. | R | R² | X | X¹ | Product: Yield, Percent | M.P., ° C. |
|---|---|---|---|---|---|---|
| 6 | —C₂H₅ | —CH—CH₃ <br> \|<br>CH₃ | H | Cl | 48 | 77–79 |
| 7 | —C₂H₅ | —C₂H₅ | H | Cl | 70 | 86–89 |
| 8 | —C₂H₅ | —⟨phenyl⟩—COOH | H | Cl |  | 172–173.5 |
| 9 | —C₂H₅ | —CH₂—CH—COOH <br> \|<br>NH₂ | H | Cl |  | 110–130 |
| 10 | —C₂H₅ | —CH₂—CH—COOH <br> \|<br>NH₂ | CH₃ | CH₃ |  |  |
| 11 | —C₂H₅ | —CH₂—CHCl₂ | H | Cl |  |  |
| 12 | —C₂H₅ | —CH₂—CH=CH₂ | H | Cl | 52 | 73.5–75 |
| 13 | —C₂H₅ | —C(CH₃)₃ | H | Cl | 34 | 108–110 |
| 14 | —C₂H₅ | —CH(cyclopentyl) | H | Cl | 75 | 67–69 |
| 15 | —C₂H₅ | —CH₂—⟨phenyl⟩ | H | Cl | 80 | 69–71 |
| 16 | —C₂H₅ | —⟨phenyl⟩ | H | Cl | 63 | 78–81 |
| 17 | —C₂H₅ | —C(CH₃)₃ | Cl | Cl | 63 | 101.5–103 |
| 18 | —C₂H₅ | —CH₂—CH=CH₂ | Cl | Cl | 50 | Syrup |
| 19 | —C₂H₅ | —CH₂—⟨phenyl⟩ | Cl | Cl | 33 | Syrup |
| 20 | —C₂H₅ | —CH(cyclopentyl) | Cl | Cl | 86 | 114–115 |
| 21 | —CH₃ | —CH₂—COOH | H | Cl |  | 97–104 |
| 22 | —C₂H₅ | —CH₂—CH₂—CH₃ | H | Cl | 65 | 80–81 |
| 23 | —C₂H₅ | —CH₂—COOH | H | Cl |  | 57–75 |
| 24 | —C₂H₅ | —CH₂—CH₂—COOH | H | Cl | 72 | 86–96 |
| 25 | —C₂H₅ | —CH₂—CH—COOH <br> \|<br>NHCOCH₃ | Cl | Cl |  |  |
| 26 | —C₂H₅ | —CH₃ | H | Cl |  |  |
| 27 | —C₂H₅ | —CH₂—CH—COOH <br> \|<br>NHCOCH₃ | H | Cl | 33 | 152–153 |
| 28 | —C₂H₅ | —CH₂—COOH | Cl | Cl |  | 185–189 |
| 29 | —C₂H₅ | —(CH₂)₂—CH—COOH <br> \|<br>NH₂ | Cl | Cl | 100 |  |
| 30 | —C₂H₅ | —⟨phenyl⟩—COOH | Cl | Cl |  | 125–128 |

TABLE I—Continued

| Ex. | R | R² | X | X¹ | Product: Yield, Percent | M.P., °C. |
|---|---|---|---|---|---|---|
| 31 | —C₂H₅ | —CH₂—CH₂—CH₂Cl | Cl | Cl | | 74–76 |
| 32 | —C₂H₅ | —CH₃ | CH₃ | CH₃ | | |
| 33 | —CH₂CF₃ | —CH₃ | CH₃ | CH₃ | | |
| 34 | —C₂H₅ | —CH₃ | Cl | CH₃ | | |
| 35 | —C₂H₅ | —CH₃ | CH₃ | Cl | | |
| 36 | —C₂H₅ | —CH₃ | —CH=CH—CH=CH— | | | |
| 37¹ | —C₂H₅ | —CH₂—CH₂—)₂ | H | Cl | 52 | 117–123 |
| 38² | —C₂H₅ | 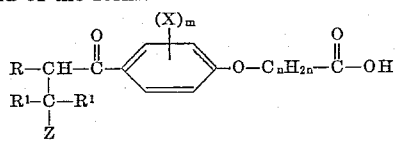 | H | Cl | 62 | 134–135 |
| 39² | —C₂H₅ | 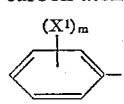 | Cl | Cl | 19 | 144.5–146 |

¹ Prepared from 1,4-butanedithiol.
² Prepared from hydrogen sulfide.

It will be apparent to one skilled in the art that in a similar manner all of the sulfinyl and sulfonyl derivatives falling within the scope of the invention may be prepared. Thus, it is that by substituting the appropriate phenol for the 2,3-dichlorophenol of Step A of Example 1 and by substituting the appropriate alkanoyl halide and mercaptan for the butyryl chloride and methyl mercaptan of Steps B through F of Example 1 and, following substantially the procedure described therein, the corresponding sulfinyl and sulfonyl derivatives may be prepared.

The novel compounds of this invention are effective diuretic and/or saluretic agents. Pharmacological studies of the products of this invention demonstrate that they possess the unique property among diurectic agents in that they can cause from 2 to 5 times more electrolyte to be excreted than can be caused to be excreted by known diuretic agents. Thus, the compounds of this invention can bring about the excretion of from 2 to 5 or more times the amount of electrolyte than can be caused to be excreted by known compounds, a property which makes them useful in therapy for the treatment of conditions resulting from an excessively high concentration of electrolyte in the body or an excessively high retention of fluid in the body such as in the treatment of edematous conditions resulting, for example, from congestive heart failure.

What I claim is:

1. A member selected from the group consisting of a compound of the formula

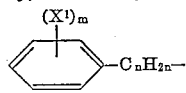

where R is a member selected from the group consisting of hydrogen, lower alkyl, halo-lower alkyl, cycloalkyl containing 3–6 nuclear carbon atoms, cycloalkylalkyl containing 3–5 nuclear carbon atoms,

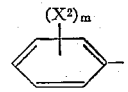

wherein X¹ is a member selected from the group consisting of hydrogen, halogen, lower alkyl, trifluoromethyl, lower alkoxy, carboxy, lower alkylsulfonyl and

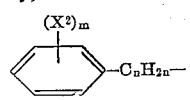

wherein X¹ is as defined above, R¹ is a member selected from the group consisting of hydrogen and lower alkyl, X is a member selected from the group consisting of hydrogen, halogen, trifluoromethyl, lower alkyl, lower alkoxy and, when substituted on adjacent carbon atoms of the benzene ring, two X radicals may be combined to form a 1,3-butadienylene chain, Z is a member selected from the group consisting of —SO—R² and —SO₂—R² wherein R² is a member selected from the group consisting of lower alkyl, lower alkoxyalkyl, 2-amino-2-carboxy-lower alkyl, halo-lower alkyl, lower alkoxycarbonyl-lower alkyl, carboxy-lower alkyl, cycloalkyl containing 5–6 nuclear carbon atoms, cycloalkylalkyl containing 5–6 nuclear carbon atoms, $$\underset{}{\overset{(X^2)_m}{\bigotimes}}-$$

wherein X² is a member selected from the group consisting of hydrogen, halogen, lower alkyl, trifluoromethyl, lower alkoxy, carboxy, and $$\underset{}{\overset{(X^2)_m}{\bigotimes}}-C_nH_{2n}-$$

wherein X² is as defined above, $$\underset{R^1}{\overset{R^1}{-C}}-\underset{R}{\overset{(X)_m}{CH}}-\overset{O}{\overset{\|}{C}}\underset{}{\bigotimes}-O-C_nH_{2n}-\overset{O}{\overset{\|}{C}}OH \text{ and } -C_nH_{2n}-Z$$

wherein Z is as defined above, m, in each occurrence, is an integer having a value of 1–4 and n, in each occurrence, is an integer having a value of 1–5, and the non-toxic pharmacologically acceptable acid addition salts thereof.

2. A compound of the formula

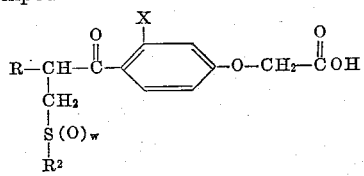

where R and R² are lower alkyl, X is halogen and w is an integer having a value less than 3.

3. A compound of the formula

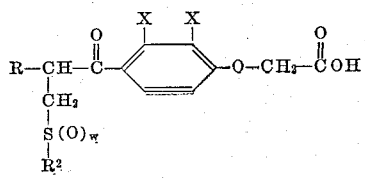

where R and $R^2$ are lower alkyl, X is halogen and $w$ is an integer having a value of less than 3.

4. A compound of the formula

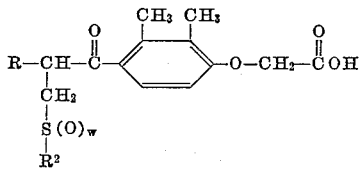

where R and $R^2$ are lower alkyl and $w$ is an integer having a value less than 3.

5. A compound of the formula

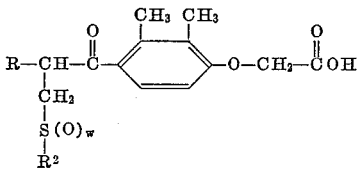

where R is halo-lower alkyl, $R^2$ is lower alkyl and $w$ is an integer having a value of less than 3.

6. A compound of the formula

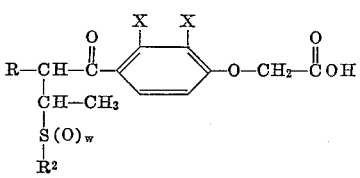

where R and $R^2$ are lower alkyl, X is halogen and $w$ is an integer having a value less than 3.

7. A compound of the formula

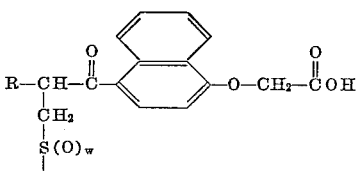

where R and $R^2$ are lower alkyl and $w$ is an integer having a value less than 3.

8. A compound of the formula

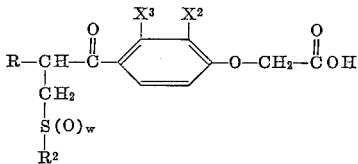

where R, $R^2$ and $X^3$ are lower alkyl, $X^2$ is halogen and $w$ is an integer having a value less than 3.

9. A compound of the formula

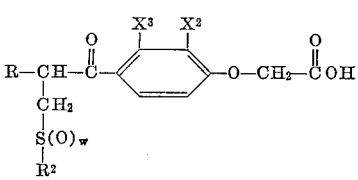

where R, $R^2$ and $X^2$ are lower alkyl, $X^3$ is halogen and $w$ is an integer having a value less than 3.

10. [2,3 - dichloro-4-[2-(methylsulfinylmethyl)-butyryl]phenoxy]acetic acid.

11. [2,3-dichloro - 4 - [2 - (mesylmethyl)butyryl]-phenoxy]acetic acid.

12. {2,3 - dichloro-4-[2-[(2-carboxy-2-aminoethyl)-sulfinylmethyl]butyryl]phenoxy}acetic acid.

13. {2,3-dichloro-4-[2-[2-carboxy - 2 - aminoethyl)-sulfonylmethyl]butyryl]phenoxy}acetic acid.

14. [2,3 - dichloro-4-[3-(2-carboxy-2-aminoethyl)-sulfinylpropionyl]phenoxy]acetic acid.

15. [2,3-dichloro-4-[3-(2-carboxy - 2 - aminoethyl)-sulfonylpropionyl]phenoxy]acetic acid.

16. [2,3-dichloro-4-[2-ethyl-3-(methylsulfinyl)-butyryl] phenoxy]acetic acid.

17. [2,3 - dichloro-4-(2-ethyl-3-mesylbutyryl)phenoxy]-acetic acid.

18. [2,3-dimethyl-4-[2-(methylsulfinylmethyl)-butyryl] phenoxy]acetic acid.

19. [2,3-dimethyl - 4 - [2-(mesylmethyl)butyryl]-phenoxy]acetic acid.

20. [4-[2 - (methylsulfinylmethyl)butyryl]naphthyloxy] acetic acid.

21. [4 - [2-(mesylmethyl)butyryl]naphthyloxy]-acetic acid.

References Cited

Organic Sulfur Compounds, Barnard et al., vol. 1 (1961), pp. 229 to 231 relied on.

LORRAINE A. WEINBERGER, *Primary Examiner.*

R. K. JACKSON, *Examiner.*

L. A. THAXTON, *Assistant Examiner.*